United States Patent [19]
Chu

[11] 3,960,533
[45] June 1, 1976

[54] LAMP HAVING CRYSTALLIZABLE LIGHT DIFFUSING ENVELOPE

[75] Inventor: Gordon P. K. Chu, Danvers, Mass.

[73] Assignee: GTE Sylvania Incorporated, Danvers, Mass.

[22] Filed: Sept. 23, 1974

[21] Appl. No.: 508,497

Related U.S. Application Data

[62] Division of Ser. No. 399,100, Sept. 20, 1974, Pat. No. 3,885,182.

[52] U.S. Cl. .................................... 65/33; 65/43; 65/59 A; 65/54; 106/39.7; 313/112; 313/116; 313/117
[51] Int. Cl.² .................................... C03B 32/00
[58] Field of Search ............... 65/33, 155, 43, 59 A, 65/54; 313/112, 116, 117; 106/39.7, 39.71

[56] References Cited
UNITED STATES PATENTS

| | | | |
|---|---|---|---|
| 1,845,376 | 2/1932 | Weld | 313/112 |
| 2,069,713 | 2/1937 | Braselton | 313/112 |
| 2,132,390 | 10/1938 | Blau | 65/33 |
| 3,128,169 | 4/1964 | Heraeus et al. | 65/134 X |
| 3,275,492 | 9/1966 | Herbert et al. | 65/33 X |
| 3,531,303 | 9/1970 | Bahat | 65/33 X |
| 3,645,711 | 2/1972 | Pirooz | 65/33 |
| 3,647,490 | 3/1972 | Pirooz | 65/33 |
| 3,663,193 | 5/1972 | Wilson | 65/33 X |
| 3,788,865 | 1/1974 | Babcock et al. | 65/33 X |

FOREIGN PATENTS OR APPLICATIONS

| | | | |
|---|---|---|---|
| 454,869 | 8/1964 | Japan | 106/39.7 |

*Primary Examiner*—S. Leon Bashore
*Assistant Examiner*—Frank W. Miga
*Attorney, Agent, or Firm*—James Theodosopoulos

[57] ABSTRACT

An incandescent lamp has an envelope made of partially crystallized glass in order to diffuse the light emanating from the filament.

2 Claims, 1 Drawing Figure

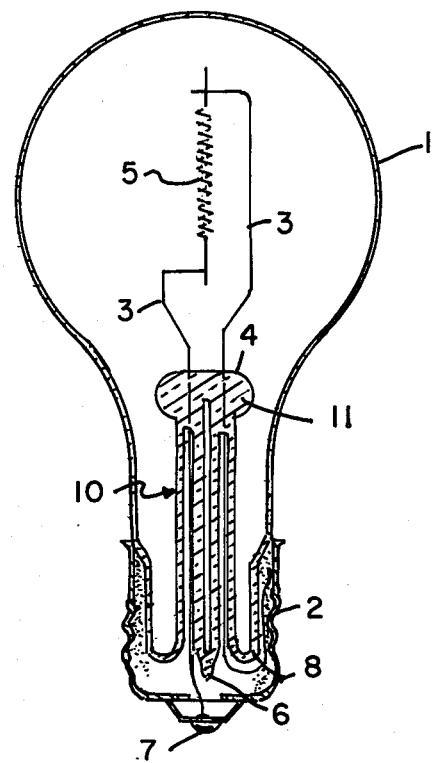

LAMP HAVING CRYSTALLIZABLE LIGHT DIFFUSING ENVELOPE

This application is a division of application Ser. No. 399,100, filed Sept. 20, 1974, now U.S. Pat. No. 3,885,182, issued May 20, 1975.

DESCRIPTION OF THE PRIOR ART

Incandescent lamps generally have a light diffusing envelope in order to eliminate the harsh glare of an incandescent filament. In inside frost lamps, the envelope is made light diffusing by etching the inner surface of the lamp envelope with hydrofluoric acid, as disclosed in U.S. Pat. No. 1,687,510.

Because of the large number of incandescent lamps manufactured annually, in the millions, large quantities of acid are used in etching, resulting in considerable discharge of acid fumes into the atmosphere.

As concern for the ecological effect of manufacturing processes on the environment has been heightened in the past few years, it has become desirable to dispense with acid etching as a method of making light diffusing envelopes.

Accordingly, it is an object of this invention to provide a light diffusing envelope that dispenses with the need of acid etching.

SUMMARY OF THE INVENTION

An incandescent lamp in accordance with this invention has an envelope that is made of uniformly partially crystallized glass. The glass is not transparent but translucent, i.e. light diffusing, and is efficient in the transmission of visible light therethrough. Moreover, the crystallized glass is readily workable so that it can be sealed to the flare of the usual glass stem press at the base of the lamp.

BRIEF DESCRIPTION OF THE DRAWING

The single FIGURE in the drawing is an elevational view, partly in section, of an incandescent lamp in accordance with this invention.

DESCRIPTION OF THE PREFERRED EMBODIMENT

As shown in the drawing, an incandescent lamp in accordance with this invention comprises a crystallized glass envelope 1 which can contain a gaseous filling such as nitrogen and argon. The bottom of envelope 1 is sealed to flare 2 of the usual stem press glass mount 10. Lead-in wires 3 extend through and are supported by stem press 4 of glass mount 10. A coiled tungsten filament 5 is supported between the upper ends of lead-in wires 3. Lead-in wires 3 extend downward between tipped off exhaust tube 6 and flare 2. One of the lead-in wires is connected to center contact 7 of the usual screw base 8 which is fastened to the bottom of envelope 1, while the other lead-in wire is connected to the rim of base 8.

The glass envelope was made from a glass having the following composition, by weight:

| | |
|---|---|
| $Li_2O$ | 13.48% |
| $Na_2O$ | 1.04 |
| $K_2O$ | 4.05 |
| $SiO_2$ | 70.71 |
| $Al_2O_3$ | 6.10 |
| $CaO$ | 0.52 |
| $MgO$ | 0.18 |
| $B_2O_3$ | 1.02 |
| $P_2O_5$ | 2.90 |

The raw materials providing these oxide ingredients were mixed and heated in a refractory tank or container at 1350° to 1400°C for 3 to 8 hours to form uniformly melted glass from which lamp envelopes were formed. At this stage the glass envelopes were transparent, having a light transmission of about 99%. The glass envelopes were then nucleated and crystallized by heating under a controlled schedule at a rate of 15° to 20°C per minute. In order to obtain uniform finely dispersed nucleation and crystallization, crystallization was carried out in two stages. First, the envelopes were maintained at a temperature of 500°–565°C for about 10 minutes. This first stage crystallization temperature range is about 50°C above the lower annealing temperature (475°–500°C) of the glass. The heating was then continued to a temperature of 750°–785°C which was maintained for 10 minutes. This second stage crystallization yields more complete crystallization. This process yielded envelopes having a light transmission of about 95% and which were sufficiently light diffusing to eliminate the harsh glare of an incandescent filament. More extensive crystallization could be obtained, for example, by more extensive second stage crystallization, such as at 770°–800°C for 20 minutes. This yields a light diffusing envelope having a light transmission of about 92% and in which the incandescent filament is not discernible through the lamp envelope.

After envelope 1 was crystallized, it was still sufficiently workable so that it could be readily sealed to stem press glass mount 10. Mount 10 is usually made of G12 glass, which is a low temperature, soft, high lead glass, most suitable for sealing dumet wire 11 which is part of lead-in wire 3.

Crystallizable glasses suitable for lamp envelopes of this invention have a composition within the following limits $Li_2O$ - 8 to 20%; $Na_2O$ and/or $K_2O$ - 1 to 7%; $SiO_2$ - 45 to 72%; $Al_2O_3$ - 4 to 20%; $CaO$ and/or $SrO$ and/or $BaO$ and/or $MgO$ - 0.6 to 7%; $B_2O_3$ - 1 to 4%; $As_2O_3$ and/or $Sb_2O_3$ and/or $P_2O_5$ and/or $MoO_3$ - 2 to 7%. The nucleation and crystallization temperature of these glasses is about 520° to 820°C, which process changes the glass from transparent to translucent, but having high efficiency of light transmission, say, at least about 85%. The nucleation temperature is between about 520° to 560°C. This means that if a lamp envelope is formed directly from the hot glass melt, the envelope must be cooled to the nucleation temperature, or preferably below said temperature, before it is reheated to the crystallizaton temperature.

I claim:

1. The method of making an incandescent lamp having a light diffusing glass envelope comprising the steps of: forming an incandescent lamp envelope from a crystallizable glass having the following composition:

| | |
|---|---|
| $Li_2O$ | 8 to 20% |
| $Na_2O$ and/or $K_2O$ | 1 to 7% |
| $SiO_2$ | 45 to 72% |
| $Al_2O_3$ | 4 to 20% |
| $CaO$ and/or $SrO$ and/or $BaO$ and/or $MgO$ | 0.6 to 7% |
| $B_2O_3$ | 1 to 4% |
| $As_2O_3$ and/or $Sb_2O_3$ and/or $P_2O_5$ and/or $MoO_3$ | 2 to 7%; | crystallizing said envelope in two steps by heating the envelope to a first stage crystallization temperature of about 500° to 565°C for a period about 10 minutes and then to a second stage crystallization temperature of about 750° to 800°C for a period between 10 to 20 minutes; and heat sealing said crystallized envelope to the flare of a stem pressed glass mount made of low temperature soft glass.

2. The method of claim 1 wherein said crystallizing step is sufficient to render said glass translucent without reducing its light transmission below 85%.

* * * * *